United States Patent
Viciano Martin et al.

(10) Patent No.: US 11,992,878 B2
(45) Date of Patent: May 28, 2024

(54) CURE TIME FOR 3D PRINTING GREEN PARTS

(71) Applicant: Hewlett-Packard Development Company, L.P., Spring, TX (US)

(72) Inventors: Fernando Viciano Martin, Sant Cugat del Valles (ES); Jason Cassidy Hower, Corvallis, OR (US); Sergio Puigardeu Aramendia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 315 days.

(21) Appl. No.: 15/734,591

(22) PCT Filed: Feb. 27, 2019

(86) PCT No.: PCT/US2019/019857
§ 371 (c)(1),
(2) Date: Dec. 3, 2020

(87) PCT Pub. No.: WO2020/176085
PCT Pub. Date: Sep. 3, 2020

(65) Prior Publication Data
US 2021/0229183 A1 Jul. 29, 2021

(51) Int. Cl.
*B22F 10/14* (2021.01)
*B22F 3/10* (2006.01)
*B22F 10/85* (2021.01)
*B22F 12/00* (2021.01)
*B22F 12/63* (2021.01)
(Continued)

(52) U.S. Cl.
CPC .............. *B22F 10/14* (2021.01); *B22F 10/85* (2021.01); *B22F 12/90* (2021.01); *B29C 64/165* (2017.08); *B29C 64/245* (2017.08); *B29C 64/393* (2017.08); *B33Y 10/00* (2014.12); *B33Y 30/00* (2014.12); *B33Y 40/20* (2020.01); *B33Y 50/02* (2014.12); *B22F 3/10* (2013.01); *B22F 12/222* (2021.01); *B22F 12/63* (2021.01); *C22C 33/02* (2013.01); *Y02P 10/25* (2015.11)

(58) Field of Classification Search
CPC .. B22F 3/10; B22F 10/14; B22F 10/85; B22F 12/222; B22F 12/63; B22F 12/90; B29C 64/165; B29C 64/245; B29C 64/393; B33Y 10/00; B33Y 30/00; B33Y 40/20; B33Y 50/02; C22C 33/02; Y02P 10/25
See application file for complete search history.

(56) References Cited

U.S. PATENT DOCUMENTS

| 8,876,513 B2 | 11/2014 | Lim et al. |
| 10,067,499 B2 | 9/2018 | Bheda et al. |

(Continued)

FOREIGN PATENT DOCUMENTS

| CN | 104936788 A | 9/2015 |
| CN | 107835739 A | 3/2018 |

(Continued)

*Primary Examiner* — Adil A. Siddiqui
(74) *Attorney, Agent, or Firm* — Shook, Hardy & Bacon L.L.P.; Elena McFarland (57) ABSTRACT

In one example, a memory having instructions thereon that when executed cause a 3D printing system to determine a cure time for a functional agent applied to print a part as a function of build platform position and then cure the functional agent for the determined cure time.

7 Claims, 7 Drawing Sheets

(51) Int. Cl.
*B22F 12/90* (2021.01)
*B29C 64/165* (2017.01)
*B29C 64/245* (2017.01)
*B29C 64/393* (2017.01)
*B33Y 10/00* (2015.01)
*B33Y 30/00* (2015.01)
*B33Y 40/20* (2020.01)
*B33Y 50/02* (2015.01)
*C22C 33/02* (2006.01)

(56) References Cited

U.S. PATENT DOCUMENTS

| | | |
|---|---|---|
| 2008/0113293 A1* | 5/2008 | Shkolnik ............... B29C 64/106 |
| | | 430/324 |
| 2016/0121599 A1 | 5/2016 | Bauer |
| 2016/0136889 A1 | 5/2016 | Rolland et al. |
| 2016/0250807 A1 | 9/2016 | Atwood |
| 2016/0266573 A1* | 9/2016 | Bheda ................... B29C 64/106 |
| 2017/0151722 A1* | 6/2017 | Prasad ................... B29C 64/165 |
| 2017/0173886 A1 | 6/2017 | Menchik et al. |
| 2019/0054652 A1 | 2/2019 | Song et al. |

FOREIGN PATENT DOCUMENTS

| | | |
|---|---|---|
| CN | 109070459 A | 12/2018 |
| EP | 2283934 A2 | 2/2011 |
| EP | 3187328 A1 | 7/2017 |
| EP | 3358405 A1 | 8/2018 |
| WO | 2008/118947 A1 | 10/2008 |

* cited by examiner

CURE TIME FOR 3D PRINTING GREEN PARTS

BACKGROUND 3D printing systems convert a digital representation of an object into a physical object. 3D printing includes any of various processes in which material is bound or solidified under computer control to create a three-dimensional object. 3D printing is also commonly referred to as additive manufacturing. 3D printing systems are often used to manufacture objects with complex geometries using materials such as thermoplastics, polymers, ceramics and metals. In powder based 3D printing, successive layers of a powdered build material are formed and portions of each layer bound or fused in a desired pattern to build up a 3D object.

DRAWINGS

The same part numbers designate the same or similar parts throughout the figures. The figures are not necessarily to scale.

DESCRIPTION

Metal parts may be printed by selectively applying a liquid binder to each of successive layers of metal powder in a pattern corresponding to the digital slice that represents each layer of the part. The binder is cured to bind the metal powder particles together in the desired shape for further processing. A bound but unfused interim printed structure is known commonly as a "green part." A green part is sufficiently robust to withstand the depowdering process in which the surrounding unbound powder is removed from the part. After depowdering, the green part is heated in a sintering furnace to burn off any residual binder and sinter/fuse the metal particles to form the final metal object.

In curing processes in which heat is used to activate latex particles in a thermally curable latex based binder, the time to fully cure the binder may vary depending on the thickness of the part. The depth of the powder bed in which the part is printed may be used as a proxy for part thickness. A deeper powder bed indicates a thicker part. In addition, where multiple parts are printed together in layers in the same powder bed, the depth of the powder bed also indicates the cumulative thickness of the parts. And, the depth of the powder bed itself may also effect cure time. Accordingly, the depth of the powder bed may be used to help more accurately determine cure time. In one example, the position of the build platform after the parts are printed is used to determine the depth of the powder bed. In another example, the number of layers of powder applied in the printing process is used to determine the depth of the powder bed.

The new technique may be implemented, for example, through programming on the print system controller using signals from a sensor indicating the position of the build platform after the parts are printed or by recording the number of layers of build material powder applied to the platform. The controller may compute the cure time according to an algorithm or read it from a look up table. The controller may be programmed to automatically instruct the curing unit to cure the binder for the determined cure time. The controller may also (or alternatively) include programming to display the cure time to an operator, for example to allow the operator to manually implement the cure time.

Examples of the new technique are not limited to metal parts or liquid binders but may be implemented with other materials. The examples described herein illustrate but do not limit the scope of the patent, which is defined in the Claims following this Description.

As used in this document, "and/or" means one or more of the connected things; a "green part" means a coherent but unfused structure formed by applying a functional agent to a 3D printing build material and curing the functional agent; a "functional agent" means a binder and/or another curable agent; and a "memory" means any non-transitory tangible medium that can embody, contain, store, or maintain information and instructions for use by a processor.

Figure 1:
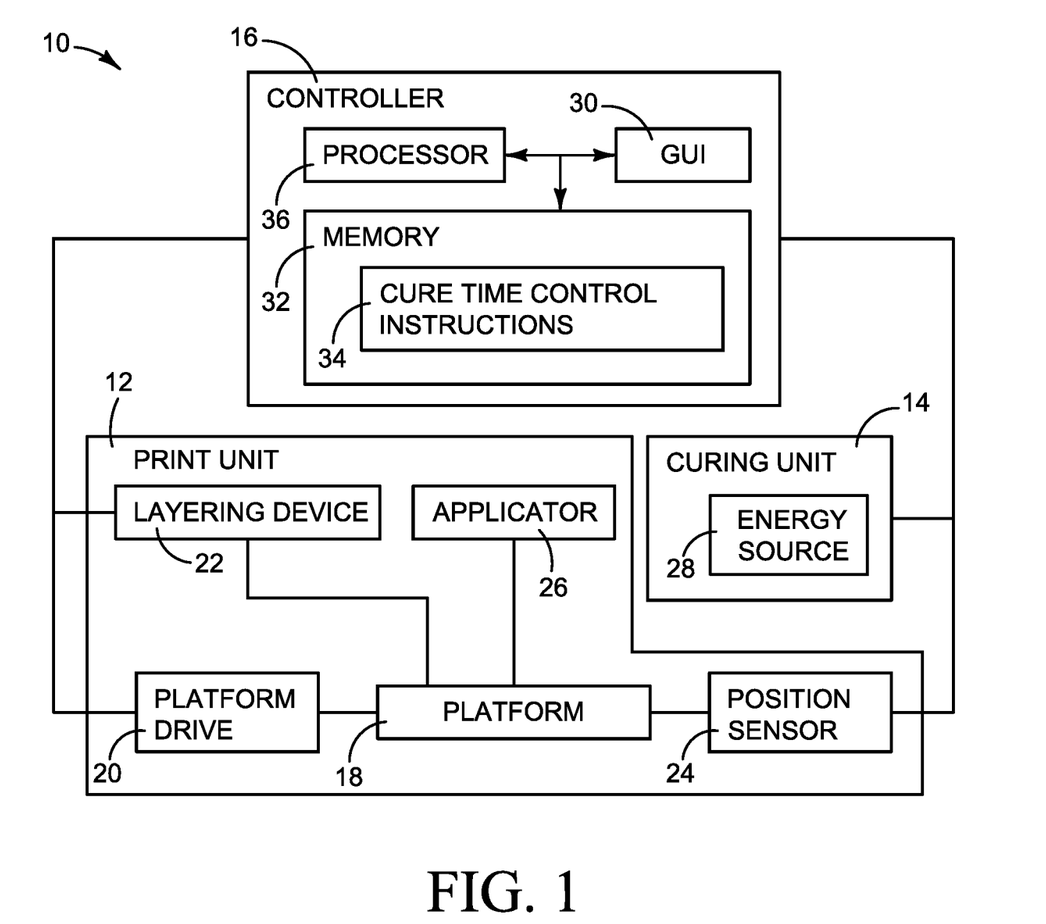
FIG. 1 is a block diagram illustrating one example of a 3D printing system that includes a controller programmed to determine curing time based on the depth of the powder bed in which green parts are printed.

FIG. 1 is a block diagram illustrating one example of a 3D printing system that includes a controller programmed to determine curing time based on the depth of the powder bed. Referring to FIG. 1, a 3D printing system 10 includes a printing unit 12, a curing unit 14, and a controller 16. Printing unit 12 includes a platform 18 to support build material during printing, a platform drive 20 to lower platform 18 incrementally to accommodate a succession of layers of powdered build material, a layering device 22 to layer build material over platform 18, a position sensor 24 to sense the position of platform 18 during printing, and an applicator 26 to selectively apply a functional agent to build material on platform 18. A 3D printing unit 12 may, and often does, include additional components not shown in FIG. 1.

Curing unit 14 includes an energy source 28 to expose the functional agent to heat or other curing energy. A curing unit 14 for green parts may include additional components not shown in FIG. 1. Printing unit 12 and curing unit 14 in system 10 may be housed or otherwise integrated together into a single 3D printing machine or they may be distinct units housed separately. For example, curing unit 14 may be implemented as an energy source 28 positioned near build platform 18 and housed together with layering device 22 and applicator 26. For another example, in 3D printing systems 10 that utilize a build platform 18 within a portable container, curing unit 14 may be implemented as a stand-alone unit remote from printing unit 12.

Controller 16 represents the processing and memory resources, programming, and the electronic circuitry and components needed to control the operative components of system 10. Controller 16 may include distinct control elements for printing unit 12 and curing unit 14 as well as components within each unit 12, 14. Controller 16 includes a GUI (graphical user interface) 30, a memory 32 with cure time control instructions 34, and a processor 36 to execute instructions 34 to determine the desired cure time and automatically instruct curing unit 14 to cure the functional agent for the determined cure time, and/or to display the cure time on GUI 30.

Figure 2:
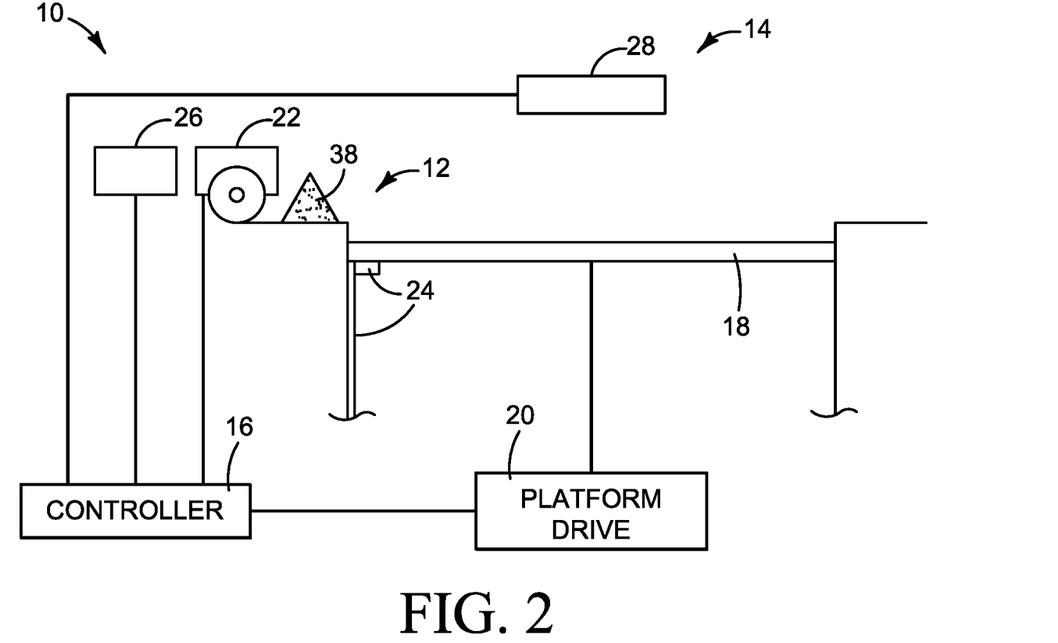
FIGS. 2-5 present a sequence of views showing one example of a process for a 3D printing system with automatic cure time control based on the depth of the powder bed.

FIGS. 2-5 present a sequence of views showing one example of a process for a 3D printing system 10 implementing cure time control. Controller 16 is omitted from FIGS. 3 and 4. Referring to FIG. 2, system 10 includes a printing unit 12 and curing unit 14 in a single machine. Printing unit 12 includes platform 18, platform drive 20, layering roller 22, position sensor 24, agent applicator 26 and controller 16 with cure time control instructions 34 from FIG. 1. Instructions 34 are not shown in FIG. 2. Cure unit 14 includes energy source 28. A pile of powdered build material 38 is staged next to platform 18 in preparation for the next layer. Roller 22 and applicator 26 are moved back and forth over platform 18 at the direction of controller 16.

Figure 3:
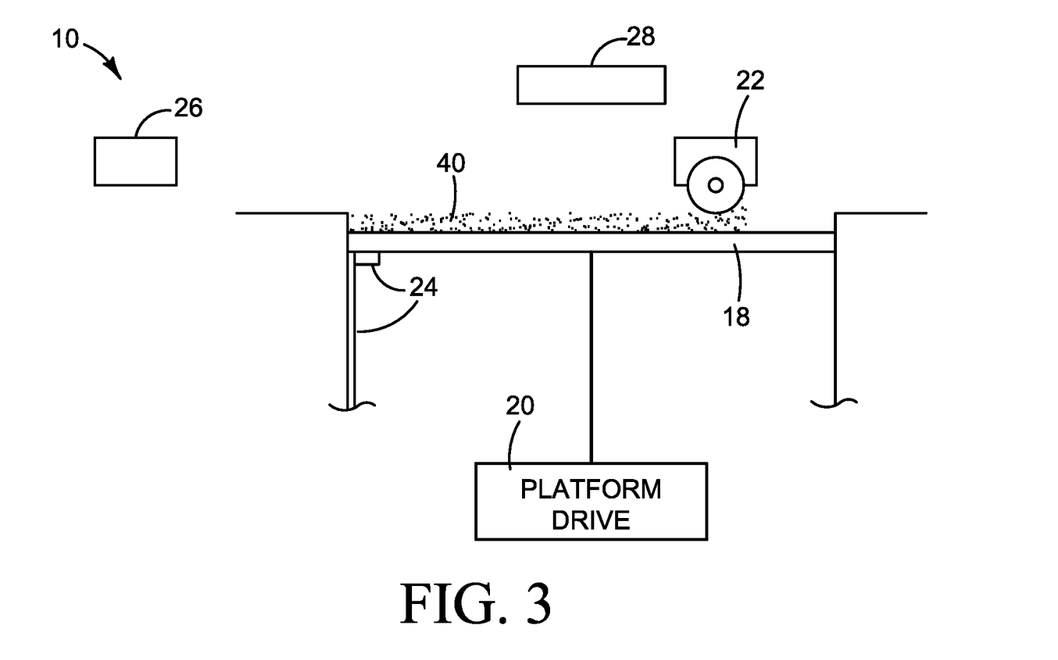
Figure 4:
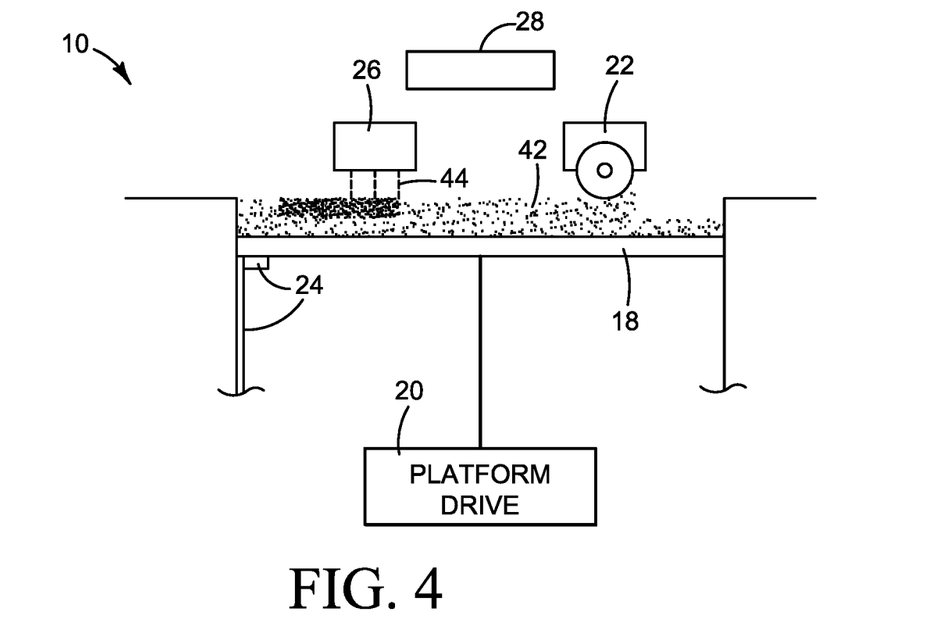
Figure 5:
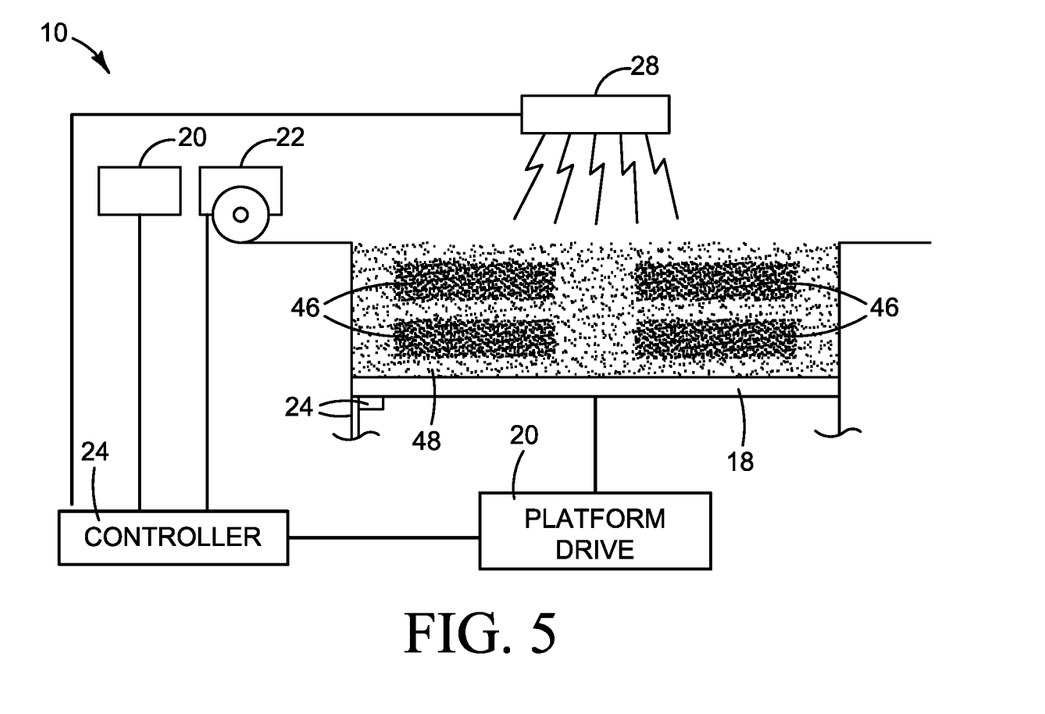

In FIG. 3, roller 22 is moving to the right spreading build material over platform 18 in a first layer 40. In FIG. 4, platform 18 has been lowered by drive 22, roller 22 is spreading a second layer 42 of build material, and applicator 26 is applying a functional agent 44 selectively on to the build material in a pattern corresponding to a digital slice of the green part being printed. The process of layering build material and applying functional agent is repeated for multiple successive layers. FIG. 5 shows a group of printed green parts 46 in a powder bed 48 with curing energy source 28 turned on to cure the agent. Only a few layers of build material are shown in FIGS. 2-5 and the thickness of each layer is greatly exaggerated to better illustrate the printing process. Hundreds or thousands of very thin layers of build material are commonly used in 3D printing to form the printed parts. FIGS. 2-5 illustrate just one example of a 3D printing system 10. Other suitable systems may be used to implement cure time control.

In one example, position sensor 24 signals controller 16 the position of platform 18 after parts 46 are printed. Cure time control instructions 34 (FIG. 1) on controller 16 uses the position of platform 18 to compute or otherwise determine the depth of powder bed 48. Alternatively, position sensor 24 may itself be configured to signal the depth of the powder bed. In either case, controller 16 determines the desired cure time and automatically energizes energy source 28 to maintain the appropriate curing conditions for the desired cure time.

In another example, controller 34 counts or otherwise records the number of layers of build material 38 applied to platform 18 to form powder bed 48. In many 3D printing systems, the nominal depth of each layer is the same and cure time control instructions 34 (FIG. 1) on controller 16 can use the number of layers to compute the depth of powder bed 48. While it is expected that system controller 16 usually determines the total number of layers that will be used to print the parts based on a digital representation of the parts input to the controller, including layers formed beneath, between, and above the parts, the layer count may be included in the digital representation of the parts received by the controller. In addition, or as an alternative, the controller may count the number of layers actually applied printing the parts for use in determining the depth of the powder bed.

Figure 6:
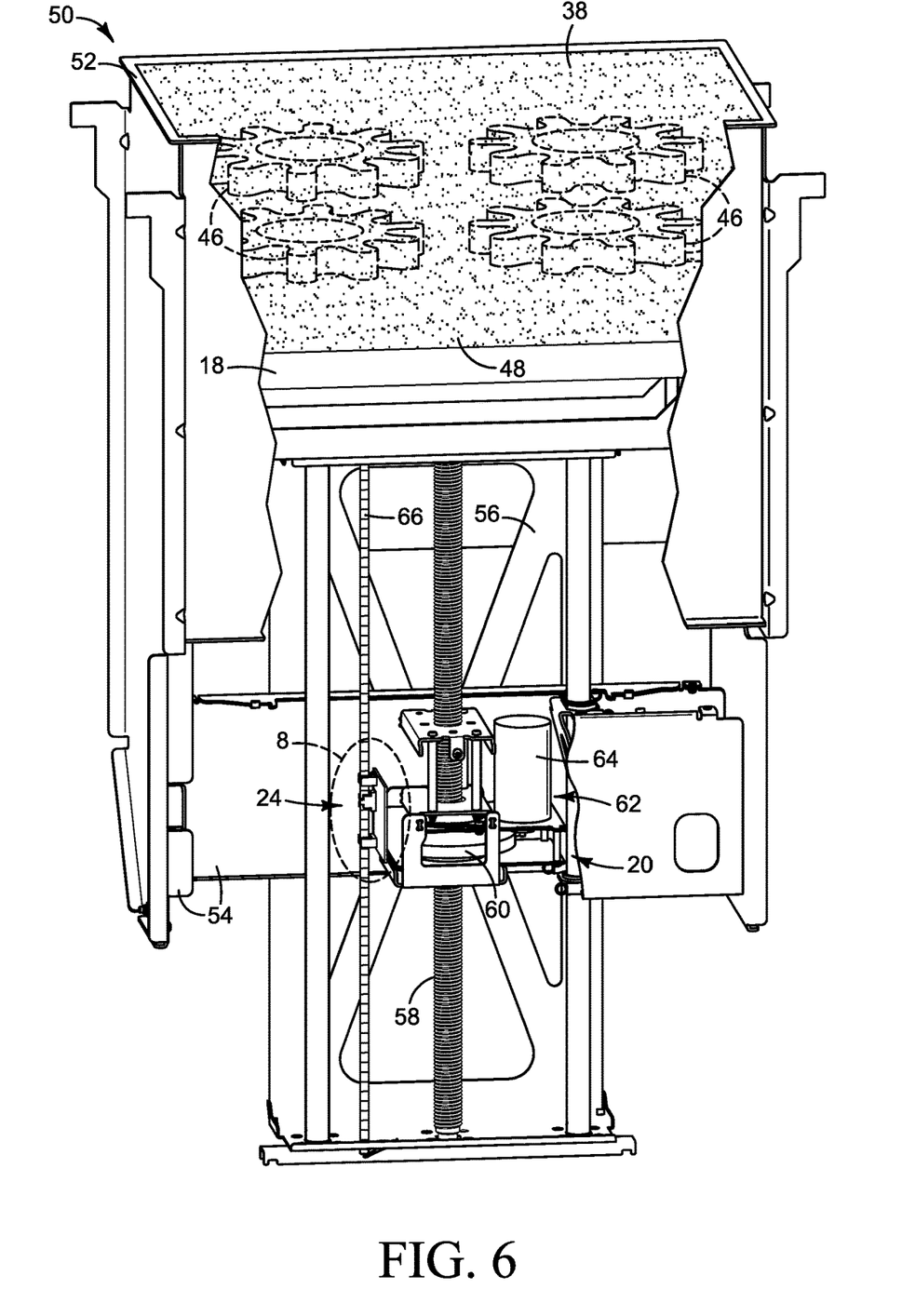
FIGS. 6 and 7 illustrate one example of a build unit for a 3D printing system.
Figure 7:
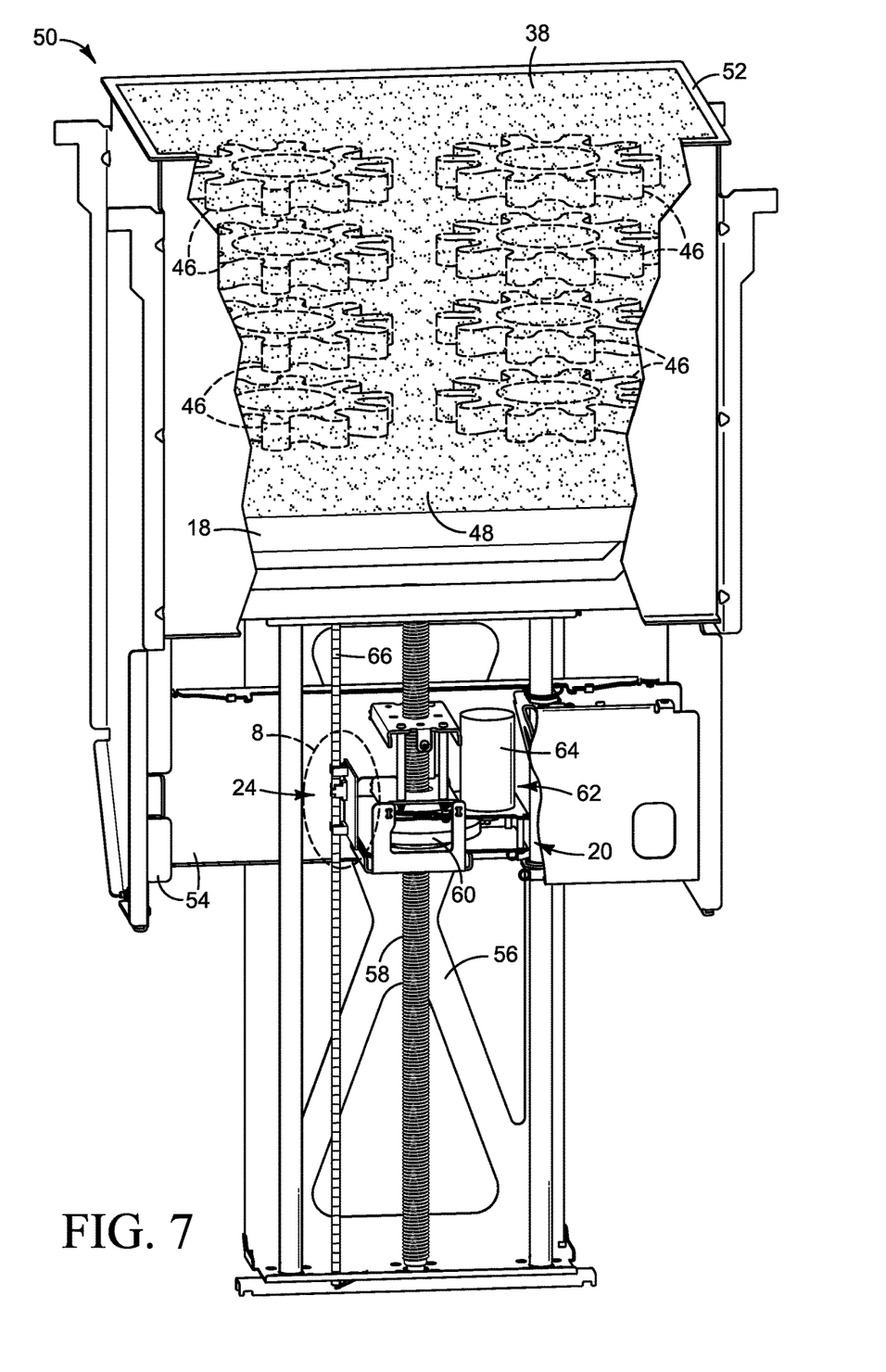
Figure 8:
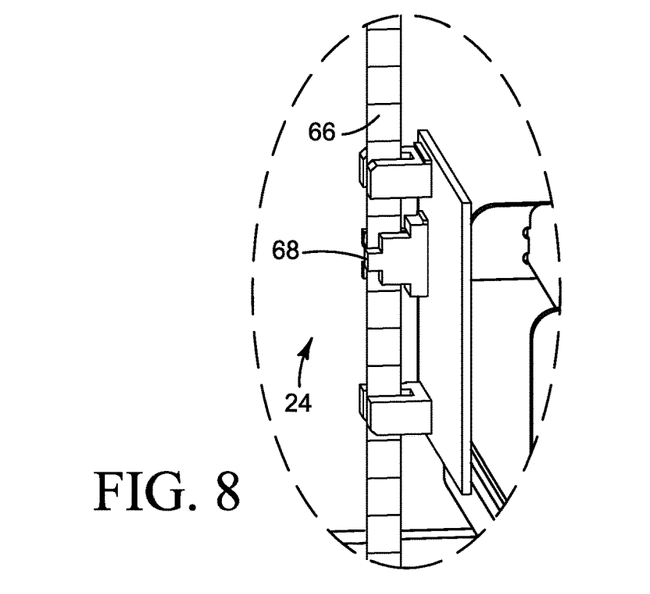
FIG. 8 is a detail from FIGS. 6 and 7.

FIGS. 6 and 7 illustrate one example of a build unit 50 with a platform 18, platform drive 20, and encoder (position sensor) 24 such as might be implemented in a printing unit 12 shown in FIGS. 2-5. FIG. 6 shows two layers of green parts 46 in a powder bed 48. FIG. 7 shows four layers of green parts 46 in a powder bed 48. FIG. 8 is a detail of the position sensor from FIGS. 6 and 7.

Referring to FIGS. 6-8, build unit 50 includes platform 18 connected to drive 20, and a container 52 surrounding platform 18 to contain build material on platform 18 during printing and curing. The front panel of container 52 is cut-away to better show parts 46 in powder bed 48. Container 52 is mounted to or integrated into a stationary chassis 54 that supports the platform drive components in printing unit 12. Where curing unit 14 is remote from printing unit 12, container 52 and platform 18 may be constructed as a portable assembly that detaches from chassis 54 for transport to the curing unit. Platform 18 sits atop a frame 56 that moves up and down relative to chassis 54 with a leadscrew 58. Leadscrew 58 (and thus frame 56 and platform 18) is lowered and raised through a drive nut 60 suspended from chassis 54 in a drive assembly 62. Drive assembly 62 includes a motor 64 to turn nut 60.

In operation, motor 64 is energized at the direction of controller 16 (FIGS. 1 and 2) to turn nut 60 incrementally and drive leadscrew 58 carrying platform 18 lower for each successive layer of build material. A linear encoder 24 includes an encoder strip 66 that moves up and down with frame 56, and thus platform 18 attached to frame 56, and an optical reader 68 mounted to chassis 54. Reader 68 reads scaled markings on strip 66 to determine the position of platform 18 during and after printing parts 46. A linear encoder shown in FIGS. 6 and 7 is just one example of a position sensor 24 to sense the position of platform 18. Other suitable position sensors may be used.

The thickness of each part 46, and the cumulative thickness of multiple parts 46 layered in powder bed 48, is approximated by the depth of powder bed 48 corresponding to the position of platform 18. Where the number of base layers of unbound powder beneath, between, and above printed parts 46 is known, the actual thickness of the parts may be closely approximated from the position of the platform after printing all parts. However, because the depth of the powder bed and the surrounding unbound build material powder also effect cure time, the depth of the powder bed may be used to help more accurately determine the appropriate cure time.

Figure 9:
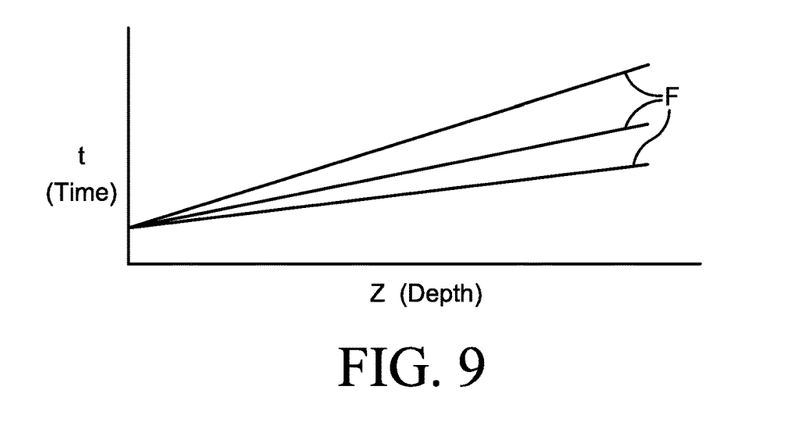
FIGS. 9 and 10 are graphs showing examples of a functional relationship between the depth of the powder bed and cure time.
Figure 10:
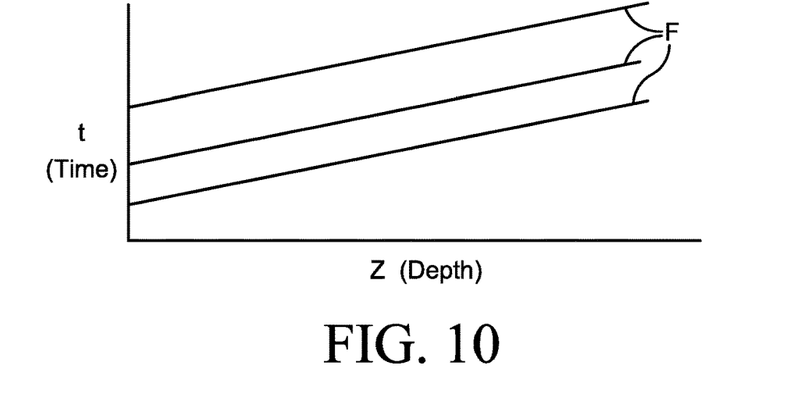

FIGS. 9 and 10 are graphs showing examples of a family of functional relationships F between the depth Z of a powder bed 48 and cure time t for a 3D printing system such as a system 10 shown in FIG. 1 and in FIGS. 2-5. Part numbers in the description of FIGS. 9 and 10 refer to the examples shown in FIGS. 1-5. Z represents the depth of powder bed 48 based on the position of a build platform 18 after the parts are printed or based on the number of layers of build material used to form powder bed 48. The family of functions F in FIG. 9 represent each of three build materials 38 and/or functional agents 44 with different characteristics used in the same printing system 10 or similar printing systems 10. The slope of each function F may be determined, for example, based on the curing energy transfer and density of build material 38 and/or the evaporation point of components of agent 44. For example, a function F for a metal build material powder 38 with high thermal conductivity and compressed during printing may have a less steep slope for curing with an IR heating lamp 28 compared to the same build material powder 38 not compressed during printing. The family of functions F in FIG. 10 represent each of three curing units 14 with different characteristics to cure a functional agent for the same green parts 46. The offset b (the t intercept) of each function F may be determined, for example, based on the curing energy applied by source 28 in a curing unit 14.

While it is expected that each functional relationship F in FIGS. 9 and 10 will be determined experientially for different build materials, agents and printing systems, it may be possible to determine functional relationships F with sufficient accuracy by modeling or other analytical techniques. Also, while linear functions F are shown in FIGS. 9 and 10, non-linear relationships are possible. A linear function F may be used to approximate a non-linear relationship, if desired, to simplify the process of determining cure time.

Figure 11:
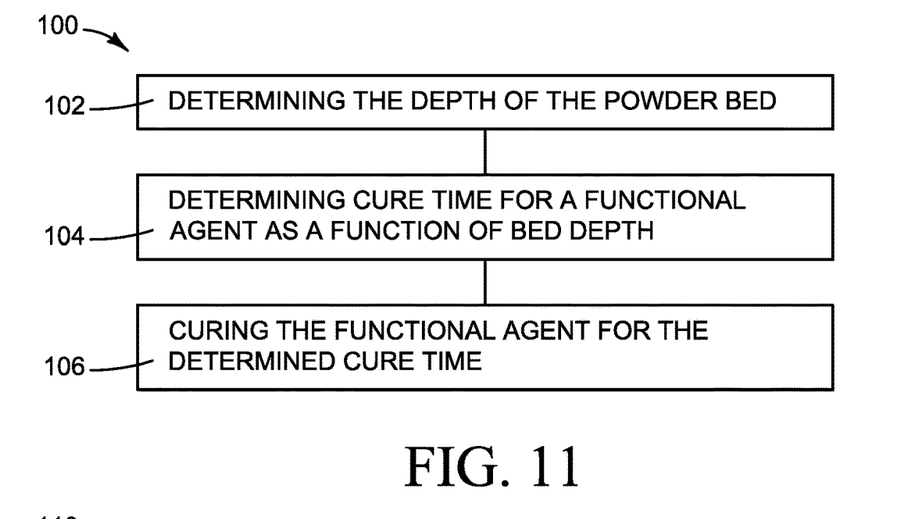
FIGS. 11 and 12 are flow diagrams illustrating example curing processes such as might be implemented in a 3D printing system shown in FIG. 1 and in FIGS. 2-5.

FIG. 11 is a flow diagram illustrating one example of a curing process such as might be implemented in a 3D printing system 10 shown in FIG. 1 and FIGS. 2-5. Referring to FIG. 11, a process 100 includes determining the depth of the powder bed (block 102), determining a cure time for a functional agent as a function of the depth of the powder bed (block 104), and then curing the functional agent for the determined cure time (block 106). In an example, the function may be represented by the equation $t=mZ+b$ where t is cure time, Z is the depth of the powder bed, m is a factor for the build material, and b is an offset for the curing unit. In an example implementation, for a 316L stainless steel build material powder, a latex binder in an aqueous solution and an infrared heater as the source of curing energy, $t=(350 \text{ s/mm} \times Z \text{mm})+3400 \text{ s}$.

Figure 12:
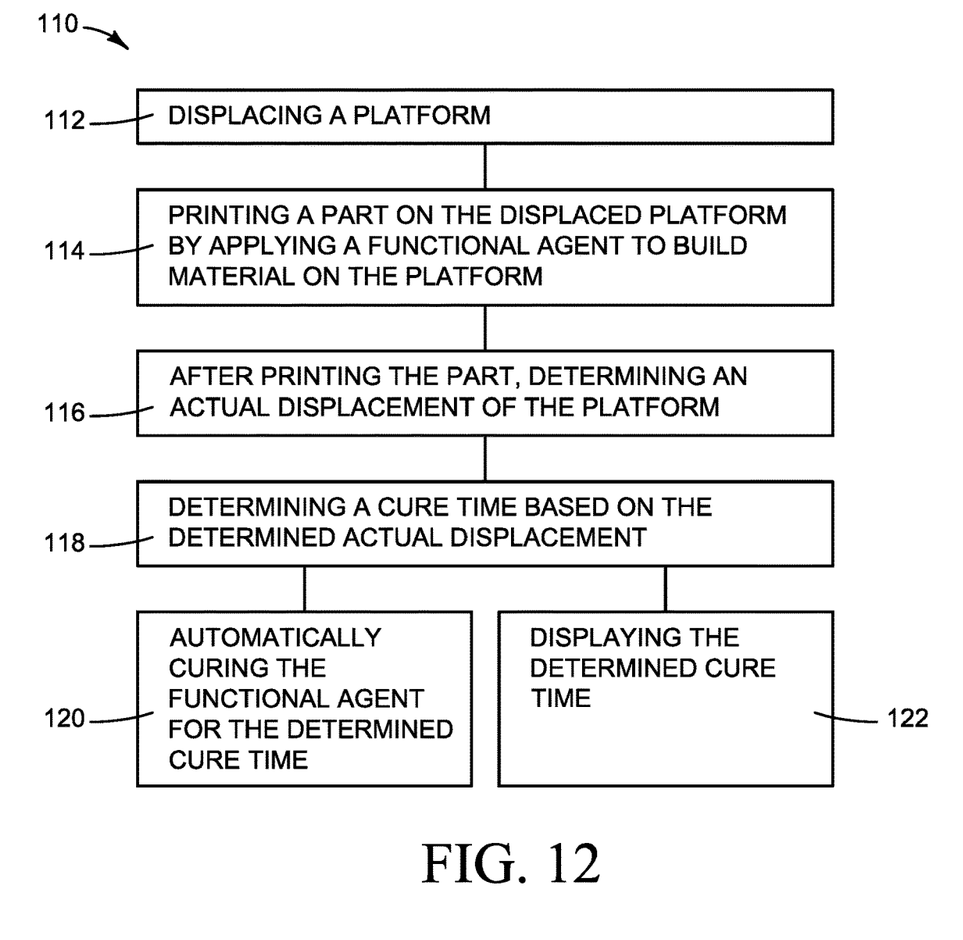

FIG. 12 is a flow diagram illustrating an example of a 3D printing process such as might be implemented in a 3D printing system 10 shown in FIG. 1 and FIGS. 2-5. Referring to FIG. 12, a process 110 includes displacing a build platform (block 112) and printing a part on the displaced platform block 114) by selectively applying a functional agent to each of successive layers of build material. Process 110 also includes, after printing the part, determining an actual displacement of the platform (116), for example with a position sensor 24 in FIGS. 1-8, determining a cure time based on the determined actual displacement (block 118), and automatically curing the functional agent for the determined cure time (block 120) and/or displaying the determined cure time (block 122), for example to allow the user to manually set the cure time for the curing unit.

As noted at the beginning of this Description, the examples shown in the figures and described above illustrate but do not limit the scope of the patent, which is defined in the following Claims.

"A" and "an" as used in the Claims means one or more.

The invention claimed is:

1. A 3D printing system, comprising:
a printing unit, including:
a drive to lower a platform incrementally to accommodate a succession of layers of build material;
a layering device to layer powdered build material on to the platform;
an applicator to selectively apply a functional agent to build material on the platform;
a curing unit to cure functional agent applied to the build material; and
a controller programmed to:
instruct the drive to lower the platform incrementally to accommodate the succession of layers of build material that together form a powder bed of build material;
instruct the applicator to apply the functional agent to the build material in some or all of the layers of build material to form a part in the powder bed;
determine a depth of the powder bed;
determine a cure time based on the determined depth; and
display the determined cure time, and/or automatically instruct the curing unit to cure the functional agent for the determined cure time, or a combination thereof.

2. The system of claim 1, wherein:
the printing unit includes a sensor to sense a position of the platform; and
the controller is programmed to receive, from the sensor, a position of the platform after the part is formed and determine the depth of the powder bed based on the position of the platform.

3. The system of claim 1, wherein the controller is programmed to determine the depth of the powder bed based on a number of layers of build material to form the powder bed.

4. The system of claim 1, wherein the programming to determine the cure time includes programming to determine the cure time according to the equation $t=mZ+b$ where t is the cure time, Z represents the depth of the powder bed, m is a factor for the build material, and b is an offset for the curing unit.

5. The system of claim 1, wherein the controller is programmed to automatically instruct the curing unit to cure the functional agent part for the determined cure time.

6. The system of claim 5, wherein the printing and curing units are integrated together into a single unit.

7. The system of claim 1, wherein the programming to determine the cure time includes programming to read a look up table with cure times determined as a function of the depth of the powder bed.

* * * * *